United States Patent
Burchard

(10) Patent No.: US 6,869,050 B1
(45) Date of Patent: Mar. 22, 2005

(54) PROFILED WING UNIT OF AN AIRCRAFT

(75) Inventor: Alexander Burchard, Stuhr (DE)

(73) Assignee: Airbus Deutschland GmbH, Hamburg (DE)

(*) Notice: Subject to any disclaimer, the term of this patent is extended or adjusted under 35 U.S.C. 154(b) by 0 days.

(21) Appl. No.: 10/733,550

(22) Filed: Dec. 10, 2003

(30) Foreign Application Priority Data

Oct. 9, 2003 (DE) .......................................... 103 46 982

(51) Int. Cl.[7] .............................................. B64E 1/10
(52) U.S. Cl. ...................................... 244/215; 244/123
(58) Field of Search ................................ 244/123, 213, 244/215, 218, 204

(56) References Cited

U.S. PATENT DOCUMENTS

| | | | | |
|---|---|---|---|---|
| 1,554,326 A | * | 9/1925 | Black | 244/123 |
| 1,764,842 A | * | 6/1930 | Jones | 244/204 |
| 2,038,337 A | * | 4/1936 | Ballmann | 244/218 |
| 2,896,880 A | * | 7/1959 | Vogler | 244/203 |
| 2,973,170 A | * | 2/1961 | Rodman | 244/123 |
| 3,144,220 A | * | 8/1964 | Kittelson | 244/203 |
| 4,084,029 A | * | 4/1978 | Johnson et al. | 428/119 |
| 4,893,964 A | * | 1/1990 | Anderson | 403/376 |
| 4,909,655 A | * | 3/1990 | Anderson | 403/267 |
| 5,088,665 A | * | 2/1992 | Vijgen et al. | 244/200 |
| 5,433,404 A | * | 7/1995 | Ashill et al. | 244/200 |
| 6,092,766 A | * | 7/2000 | LaRoche et al. | 244/200 |
| 6,105,904 A | * | 8/2000 | Lisy et al. | 244/199 |
| 6,116,540 A | * | 9/2000 | Arata | 244/87 |
| 6,119,978 A | * | 9/2000 | Kobayashi et al. | 244/35 R |
| 6,273,367 B1 | * | 8/2001 | Mueller | 244/123 |
| 6,345,792 B2 | * | 2/2002 | Bilanin et al. | 244/215 |

* cited by examiner

Primary Examiner—Teri P. Luu
Assistant Examiner—Stephen A Holzen
(74) Attorney, Agent, or Firm—W. F. Fasse; W. G. Fasse

(57) ABSTRACT

The deformation characteristic of a profiled aerodynamic aircraft component is improved by forming ridges (6, 7) in the top and bottom skin (4, 5) of the component. Two ridges (6, 7) form a pair in which the bottom ridge (7) is at least partially nested in the top ridge (6) to the extent that the ridges are bonded to each other in a trailing edge area (9) of the component along a width (W) extending in the depth or y-direction of the component. The ridges taper from the trailing edge area (9) toward the leading edge (1) of the component and the forward ridge end (6A, 7A) merges into the respective skin at a point spaced form the leading edge. The ridges function as ribs and strengthen the component while making it flexible for minimizing the introduction of compulsion forces when the component is deflected.

23 Claims, 5 Drawing Sheets

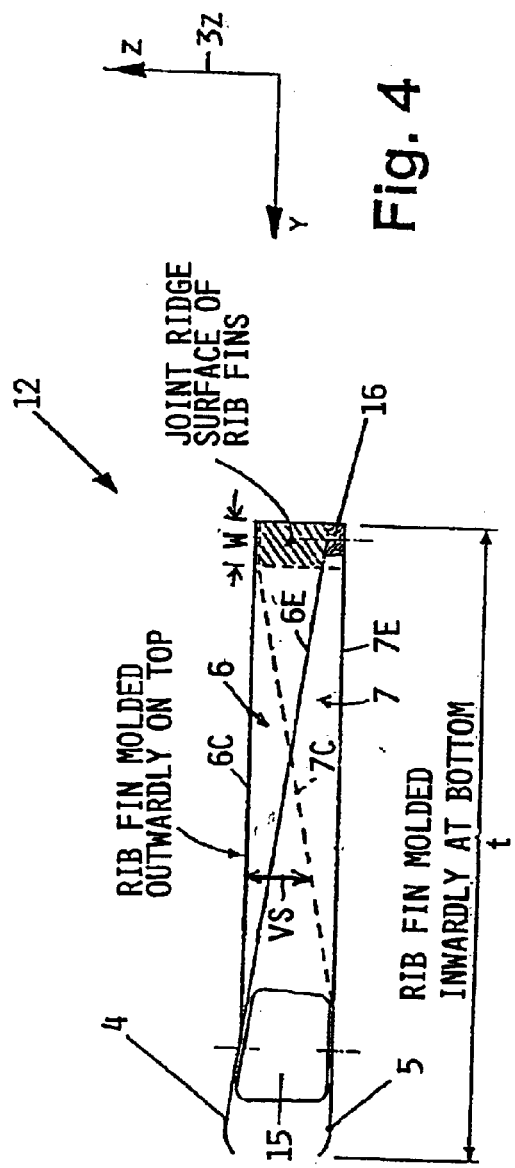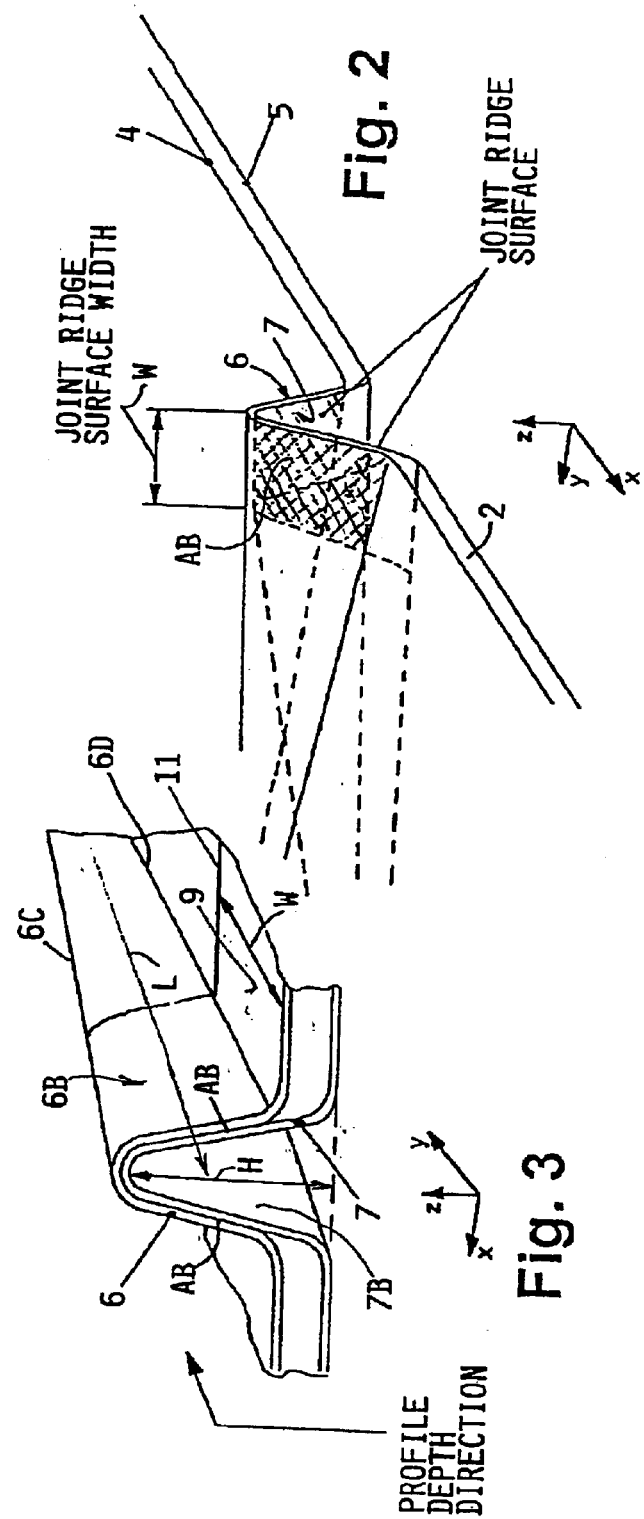

PROFILED WING UNIT OF AN AIRCRAFT

PRIORITY CLAIM

This application is based on and claims the priority under 35 U.S.C. §119 of German Patent Application 103 46 982.6 filed on Oct. 9, 2003, the entire disclosure of which is incorporated herein by reference.

FIELD OF THE INVENTION

The invention relates to a profiled aircraft component that forms part of a wing unit or a tail unit. Such units have a leading edge and a trailing edge as well as an inner structure covered by a top skin and a bottom skin. Both skins are supported by the inner structure between the leading and trailing edges.

BACKGROUND INFORMATION

The control of a flying aircraft is accomplished by aerodynamically effective control surfaces such as ailerons, flaps, tabs, rudder surfaces and elevator surfaces referred to herein as aircraft components or simply as control surfaces which are conventionally integrated into other aircraft components, e.g. wings and/or tail assemblies of an aircraft. Rolling motions of an aircraft are controlled by an aileron installed in each wing. Each aileron is normally connected to the respective wing trailing edge by a hinge that permits operating the aileron up or down for the intended influence on the flight situation.

Common to all control surfaces is the fact that these control surfaces have a relatively short length compared to the wing span of an aircraft while simultaneously having a large depth compared to the wing depth measured between the leading and trailing edge of the wing. As shown in FIG. 5 a control surface is normally connected to the wing by two hinges which provide a statically determined mounting. Due to the relatively small length of the control surface, such as an aileron, the difference between the deformation of the control surface, and the deformation or bending line of the wing also remains small. In such a mounting the bending of the wing in the z-direction is not imposed on the aileron, whereby no compulsion or unavoidable forces are generated in the aileron. Such forces would, however, occur for example in a mounting of the aileron to the landing flap with three hinges. Such unavoidable forces cause disadvantages which must be taken into account particularly where it is necessary to use slender control surfaces mounted with a continuous hinge connection formed by three or more hinges. In this connection the control surface under consideration has a length of about 4 m and a depth of about 0.4 m. Such a control surface technically also referred to as "tab" must be connected with more than two hinges to the wing or to the landing flap as shown in FIG. 6 in order to assure an aerodynamically satisfactory connection, whereby the hinge lines coincide as shown in FIG. 6 when the control surface is not deflected.

The aerodynamically exact mounting shown in FIG. 6 is achieved only by the use of at least three hinges, whereby it is unavoidable that compulsion forces are imposed on the control surface by the bending of the component to which the control surface is hinged. In addition to the compulsion forces generated by the bending of the wing or landing flap to which the control surface is hinged, compulsion forces are also generated by the bending of the control surface itself about its stiff axis which has a large moment of inertia when the deflection takes place while the hinge line is bent.

FIG. 7 illustrates the formation of compulsion forces in the aileron or tab due to the bending of the component to which the tab is secured by a continuous hinge. The wing or landing flap is bent upwardly, whereby compulsion forces generate pressure in the tab when the tab is deflected upwardly, causing a negative tab deflection. When the tab is deflected downwardly, in a positive tab deflection, tension forces would be generated in the tab. Thus, depending on the bending direction of the component to which the tab is hinged, and depending on the positive or negative tab deflection, pressure or tension forces will be generated in the tab. Such forces can damage the tab to the extent that it may fail unless countermeasures are taken. Such countermeasures call conventionally for either strengthening the stringers and/or ribs or installing additional stringers and/or ribs. In both instances additional weight cannot be avoided. Moreover, heavier tabs require higher actuator forces and larger mounting forces in the hinges must be taken up. Moreover, stiffer tabs may adversely influence the deformation characteristic and thus the aerodynamic characteristic of the component to which the tab is connected, for example a wing or a landing flap or tail unit.

OBJECTS OF THE INVENTION

In view of the foregoing it is the aim of the invention to achieve the following objects singly or in combination:

- to construct an aircraft component and/or a control surface connected to such a component by at least three hinges in such a way that the above outlined problems are avoided;
- to avoid or minimize the imposition of compulsion forces by making the respective component flexible in the y- and z-axis and stiff in the x-axis so that the respective component will adapt itself to the hinge line not only when the tab is in the 0° position, but also when it is deflected positively or negatively downwardly or upwardly;
- to construct the respective component of lightweight materials such as CFC sandwich materials, to thereby reduce the weight of such components generally and specifically also at the areas where mounting forces must be taken up;
- to achieve the above objects by aerodynamic improvements in the structure of the respective components and preferably also in components to which the present control surfaces are mounted;
- to also minimize or avoid other adverse effects caused by the bending of a control surface and/or by the bending of the component to which the control surface is mounted; and
- to reduce the mounting and actuator forces to achieve a weight reduction in the areas where these forces are normally effective, namely where these components are hinged to one another.

SUMMARY OF THE INVENTION

The above objects have been achieved according to the invention in a profiled aerodynamic aircraft component that comprises an inner structure such as spars and ribs between a leading edge and a trailing edge, whereby the component has a top skin and a bottom skin supported by the inner structure. The component has a longitudinal axis extending from end to end, in the x-direction, a depth axis extending between the leading and trailing edge in the y-direction. These components are equipped according to the invention with at least one first ridge bulging outwardly in the top skin and at least one second ridge bulging in the bottom skin toward the at least one first ridge. The bulge extends in the z-direction. The first and second ridges are also referred to as first and second fins or rib fins. These ridges or fins begin in an area next to the trailing edge or preferably at the trailing edge and extend toward the leading edge in the direction of the depth axis and each rib or fin has a height that is largest in the trailing edge area and diminishes from the trailing edge area toward the leading edge.

The ridges or fins are provided in pairs so that the second ridge is at least partly nested in the first ridge to provide an improvement in the aerodynamic characteristic of the component equipped with such fins or ridges.

Where the component is equipped with several pairs of such ridges or fins, these pairs are spaced from one another along the longitudinal axis of the respective aircraft component, whereby the on-center spacing between neighboring ridges may be uniform and/or the spacings may differ from one another.

BRIEF DESCRIPTION OF THE DRAWINGS

In order that the invention may be clearly understood, it will now be described in connection with example embodiments thereof, with reference to the accompanying drawings, wherein:

FIG. 2 shows a broken away perspective view of a first end of the two rib ridges which are joined to each other at least along a width in a trailing edge area;

FIG. 3 is a view similar to that of FIG. 2, however in the direction of the profile depth to illustrate the nesting of the two fins or ridges, one within the other to form a pair;

FIG. 4 shows a schematic view in the longitudinal direction of the component with the ridges forming a pair joined to each other in the hatched trailing edge area;

DETAILED DESCRIPTION OF A PREFERRED EXAMPLE EMBODIMENT AND OF THE BEST MODE OF THE INVENTION

Figure 5:
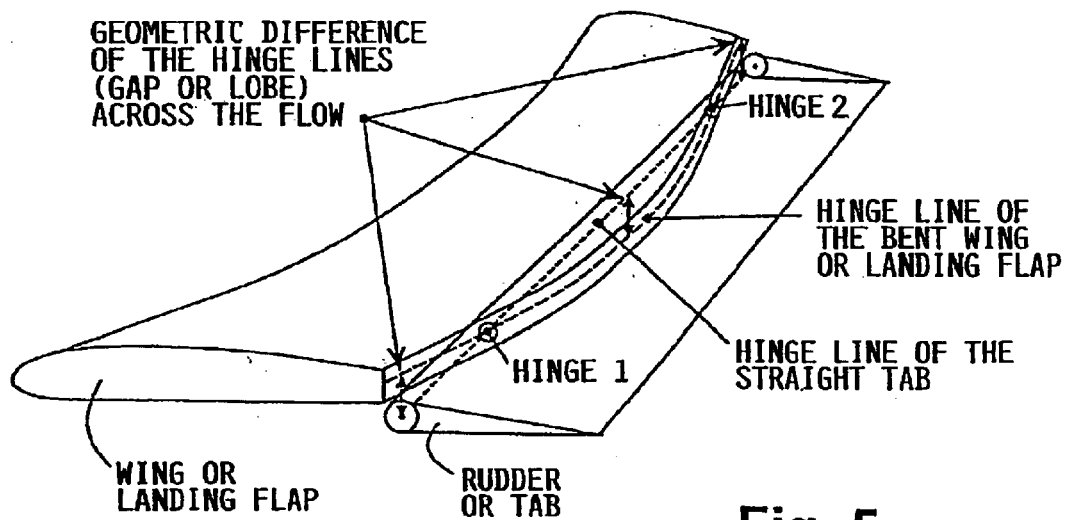
FIG. 5 shows a conventional two hinge mounting of a tab to a wing or landing flap.
Figure 6:
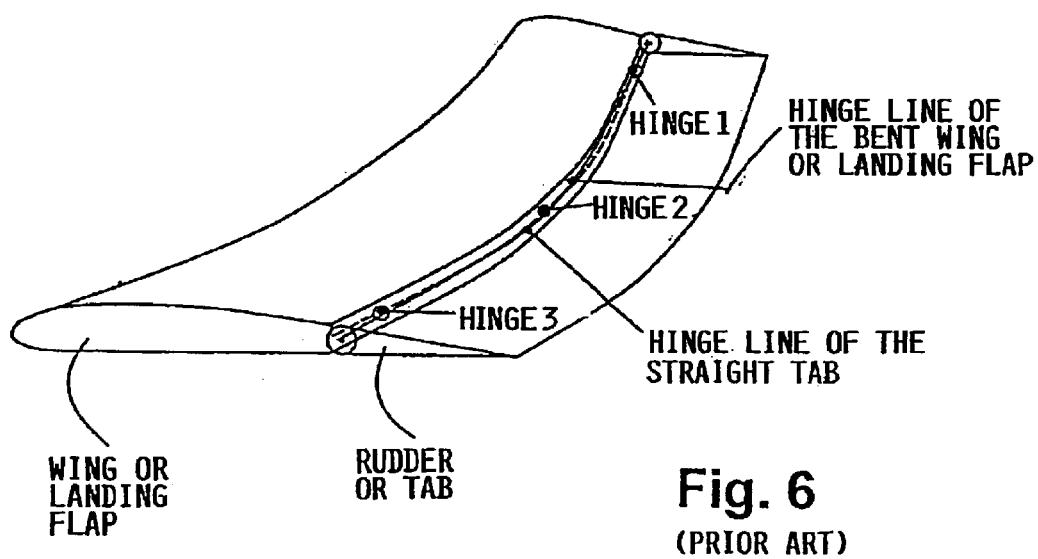
FIG. 6 is a view similar to that of FIG. 5, but illustrating a three inch mounting.
Figure 7:
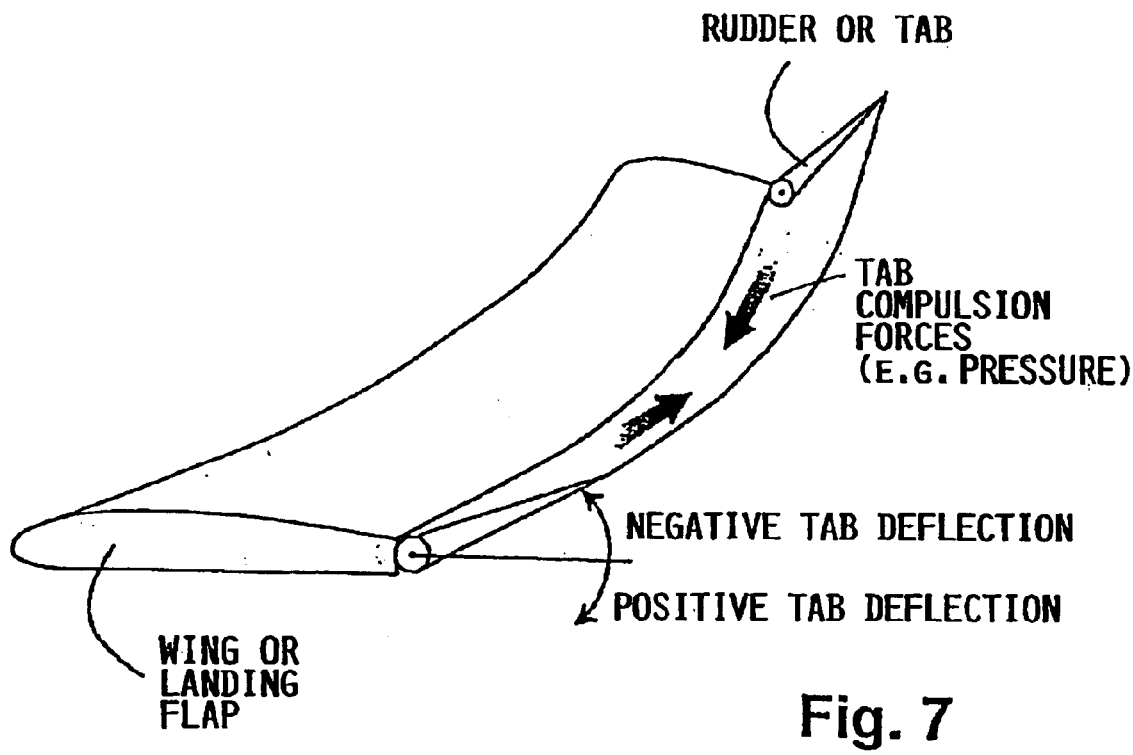
FIG. 7 shows a two hinge mounting with the flap deflected in the negative, upward direction whereby the black arrows show compulsion forces as pressure forces in the tab.

FIGS. 5, 6 and 7 have been adequately described above and are self-explanatory with the labels provided in these prior art Figures.

Figure 1:
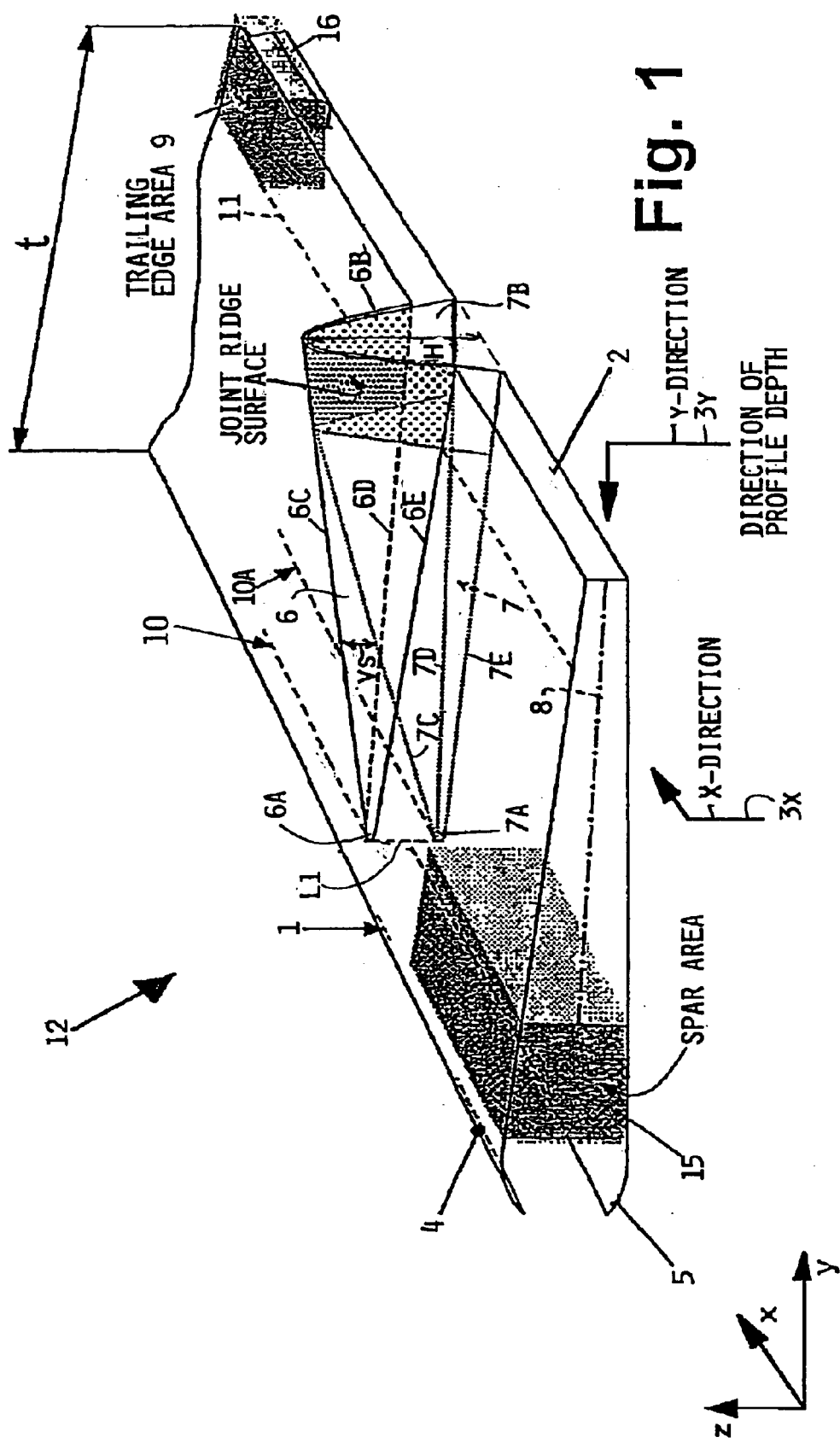
FIG. 1 is a perspective, simplified illustration of an aircraft component such as a landing flap provided according to the invention with a pair of ridges or fins of which one fin is formed in the top skin and the other fin is formed in the bottom skin.

FIG. 1 shows an aircraft component 12, for example a landing flap constructed according to the invention. The aircraft component 12 has an aerodynamic profile with an inner structure that includes a spar area 15 extending in the x-direction along the leading edge 1, a rib area not shown, and a trailing edge area 9 extending between a trailing edge 2 and a dashed line 11 which extends in the x-direction and parallel to the trailing edge 2. The dashed line 11 is spaced from the trailing edge 2 by a width W to be described in more detail below. The trailing edge 2 is equipped with a trailing edge bar 16.

The profiled, aerodynamic component 12 has a top skin 4 and a bottom skin 5 mounted to the inner structure of the component. According to the invention a portion of the top skin 4 is formed outwardly in the z-direction to produce a first ridge or fin or rib fin 6. Similarly, a portion of the bottom skin 5 is deformed to form a second ridge, fin or rib fin 7 which nests at least partially inside the ridge or fin 6. The ridge 6 has a first ridge end 6A, preferably formed as a tip that is positioned on a fictitious line 10 extending in parallel to the leading edge 1 and spaced from the leading edge 1. This fictitious line 10 is preferably located in the spar area 15. The ridge 6 further has a first ridge portion 6B which has the above mentioned width W shown in FIGS. 2, 3 and 4. The width W extends in the profile depth or y-direction. The first ridge portion 6B is connected to the first ridge end 6A by a ridge portion bounded by a ridge line 6C and top skin lines 6D and 6E. These lines 6C, 6D and 6E show how the first ridge 6 tapers from the trailing edge 2 toward the leading edge 1.

The ridge, fin or rib fin 7 is constructed and shaped in the same way as described above. Thus, the second ridge 7 has a second ridge end 7A and a second ridge portion 7B connected to the second ridge end 7A by the ridge line 7C and the bottom skin lines 7D and 7E. Thus, second ridge 7 also tapers from the second ridge portion 7B toward the second ridge end namely from the trailing edge 2 toward the leading edge 1. Each deformed portion of the top skin 4 and of the bottom skin 5 is shaped or formed or molded in the z-direction in such a way that the ridge or rib 7 is at least partially nested within the ridge 6, thus forming a pair of ridges 6 and 7. Preferably, first and second ridges 6 and 7 have the same length in the Y-direction, whereby the first ridge end 6A and the second ridge end 7A are located vertically one above the other on a common vertical line L1 extending in the z-direction. The ridge ends 6A and 7A will not both be located on the common line L1 if the ridges 6 and 7 have different lengths in the Y-direction.

Incidentally, the component 12 has a profile centerline 8 extending in the y-direction and a profile depth t from leading edge 1 to trailing edge 2 in the y-direction.

Figure 8:
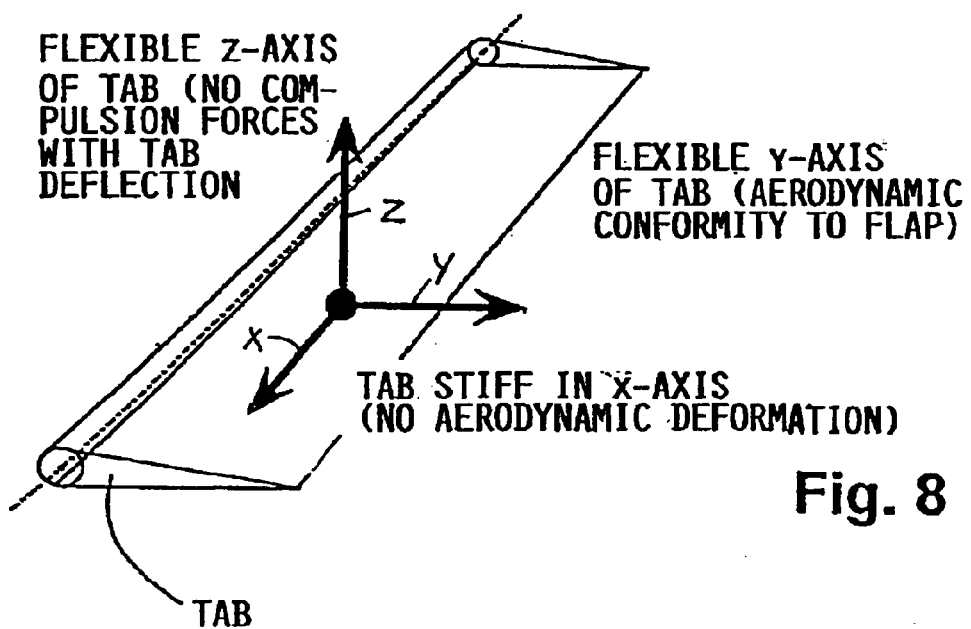
FIG. 8 illustrates schematically the prima ry object of the invention or rather aerodynamically desirable features that will minimize or avoid the imposition of compulsion forces on or in the tab.

Referring to FIGS. 1, 2, 3 and 4 in conjunction, the first end portion 6B of the ridge 6 and the second end portion 7B of the second ridge 7 are so shaped that the surfaces of the first and second end portions 6B and 7B are in intimate contact with each other along the width W in the y-direction in the trailing edge area 9 where the two ridges 6 and 7 forming a pair are permanently bonded to each other. This bond may be made with the help of a cold or hot adhesive which may be either a single component or a multi-component adhesive or any other suitable adhesive, whereby the bonding may be enhanced by heating and/or pressing for a respective curing when the top skin 4 and the bottom skin 5 are made of fiber composite materials such as CFCs. The two ridge surfaces forming the end portions 6B and 7B may be riveted to one another in the area with the width W, particularly if the top and bottom skins are made of materials suitable for riveting. In all of these embodiments the ridge or ridges stiffen the respective top or bottom skin 4, 5 particularly in the z-direction while simultaneously making the component provided with the ridges flexible around the z-axis and the y-axis as shown in FIG. 8. The flexibility about the z-axis avoids or minimizes the introduction of compulsion forces into the component such as a tab even if the tab is deflected out of its 0°-position. Similarly, the flexibility about the y-axis of the tab permits an aerodynamic conformity of the tab to the component such as a flap. However, the tab remains stiff in the x-direction and there is no aerodynamic deformation in the x-direction when the tab is deflected. Please see FIG. 8.

FIGS. 2 and 3 show the adhesive bonding AB merely as an interface between the ridges 6 and 7. FIG. 2 further shows a ±45° fiber orientation in the fiber composite materials of which the top skin 4 and the bottom skin 5 are made. The ridges 6 and 7 have a height H, whereby the height of the outer or upper ridge 6 is smaller than the height of the lower or inner ridge 7. A complete bonding is assured between the interface surfaces of the two ridges 6 and 7 along the width W corresponding to the width of the trailing edge area 9 which is reinforced by the above mentioned trailing edge bar 16 as seen in FIGS. 1 and 4. The first end 6B of the first ridge 6 and the second end 7B of the second edge 7 as shown in FIG. 3 do not need to coincide with their end face exactly with the trailing edge 2. It is satisfactory if the ridges 6 and 7 start within the width W. In any construction the ridge lines 6C and 7C will be spaced from each other between the bonded area and the respective ridge end 6A, 7A. The respective spacing VS is shown in FIGS. 1 and 4 and increases from right to left due to the tapering of the ridges 6 and 7 from right to left in FIG. 4. Correspondingly, the height H of the respective ridge 6 and 7 diminishes from right to left. This construction provides the required flexibility around the z-axis while permitting a stiffening of the skins 4 and 5 in the z-direction. Particularly, the bonding of the ridges 6 and 7 to each other along the width W strengthens the entire tab structure in the x-direction, whereby the ridges take over the function of the ribs in a profiled aircraft component. The height H of the ridges 6 and 7 can be diminished from right to left in FIG. 4 because their neutral phase runs along the respective ridge lines 6C and 7C where the least deformations take place when the respective component is operated to deflect up or down. These ribs according to the invention stiffen the entire structure in the x-direction, thereby improving the capability of the structure to transmit or take up shearing forces. Due to the bonding of the ridges to each other along the width W no seal of the stretchable zone at the end of the ridges 6, 7 is required. In a component according to the invention the box spar 15 takes up any torsion loads and is thus dimensioned to be sufficiently stiff for this purpose, whereby a spar 15 with a closed cross-sectional profile having a ±45° fiber orientation in the fiber composite construction of the spar 15 is ideal. FIG. 4 shows such a closed profile of the spar 15.

Figure 9:
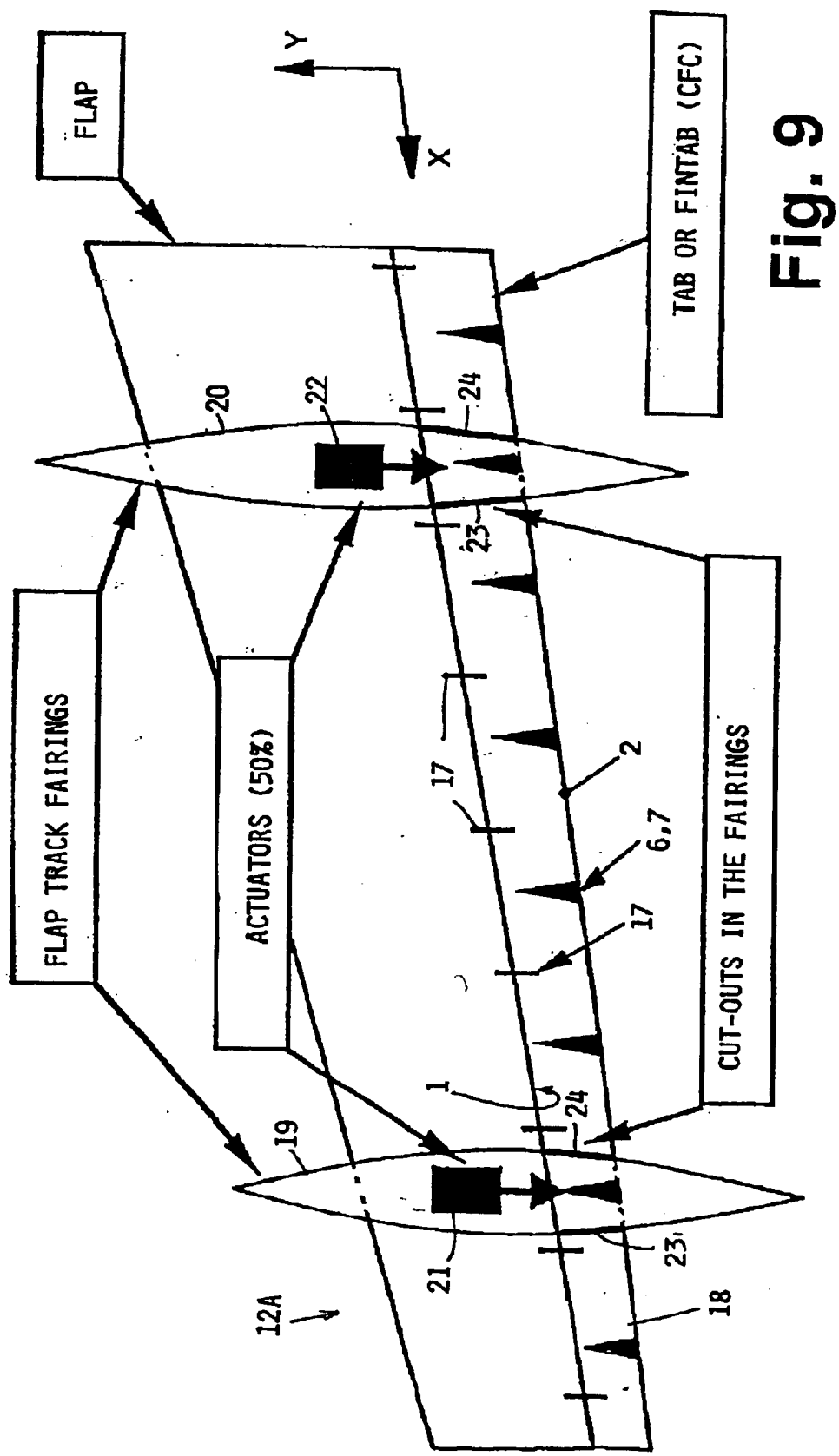
FIG. 9 illustrates a schematic top plan view of an aircraft wing or flap equipped with a tab provided with a plurality of ridges or fins.

FIG. 9 shows an aircraft component 12A such as a wing or a landing flap or a tail fin. A tab 18 constructed according to the invention, for example as a CFC fintab is secured with its leading edge to the trailing edge of the component 12A by a plurality of hinges 17. A plurality of ridges 6 and 7 forming respective pairs of ridges as described above is spaced at predetermined spacings along the tab 18. These predetermined on-center spacings between neighboring pairs of ridges 6, 7 may be uniform or may differ from one another. Flap track fairings 19, 20 which house actuators 21 and 22 for deflecting the tab 18. The fairings 19, 20 are mounted on the component 12A. Each faring is equipped with cut-outs to accommodate the deflection motion of the tab 18. Each actuator 21, 22 is constructed to provide about 50% of the required power for operating the tab 18 which is preferably made of carbon fiber composite materials, CFC-fin tip.

The length L of the ridges 6, 7 is either shorter or longer than one half of the profile depths t, depending on the desired aerodynamic characteristics of the component. Preferably the ridges are longer than the profile depth t and end at 6A, 7A in the spar area 15. The ridge ends 6A, 7A are preferably, but not necessarily aligned along a line L1 extending perpendicularly to the depth axis 8. Regardless of the position of the ridge ends 6A, 7A, these ridge ends 6A, 7A are preferably shaped as pointed tips to provide a desirable aerodynamic ridge configuration, particularly for the first ridge 6 in the top skin 4.

The bulging-out configuration of the ridges 6, 7 as best seen in FIG. 3 has preferably but not necessarily a sectional configuration that resembles a parabola which opens downwardly in a wing component such as a flap, tab or aileron, or it opens backwardly in a tail component such as a rudder fin or tab. In an elevator component the ridge sectional configurations also opens downwardly.

The ridges 6, 7 preferably have the outer configuration of a longitudinal portion of an aerodynamically formed cone that is cut-off lengthwise, but not necessarily along a central longitudinal cone axis.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An aircraft component comprising an inner structure, a leading edge (1) and a trailing edge (2), a top skin (4) supported by said inner structure between said leading and trailing edges, a bottom skin (5) supported by said inner structure between said leading and trailing edges, said aircraft component having a longitudinal axis (3) extending from end to end of said aircraft component and a depth axis (8) extending perpendicularly to and between said leading edge (1) and said trailing edge (2), said aircraft component further comprising at least one first ridge (6) bulging outwardly in said top skin (4) and at least one second ridge (7) bulging in said bottom skin (5) toward said at least one first ridge (6), wherein said first and second ridge begins in an area (9) of said trailing edge (2) and extends toward said leading edge in the direction of said depth axis (8), each of said first and second ridges (6, 7) having a height (H) that is largest in said trailing edge area (9), said height (H) of said first and second ridges (6, 7) diminishing from said trailing edge area (9) toward said leading edge (1).

2. The aircraft component of claim 1, wherein said aircraft component has a depth (t) extending from said leading edge (1) to said trailing edge (2) in a direction of said depth axis (8), said first and second ridges (6, 7) having a ridge length (L) in said depth direction, said ridge length (L) being shorter than one half of said depth (t).

3. The aircraft component of claim 1, wherein said first and second ridges (6, 7) begin at said trailing edge (2) and end centrally in said aircraft component.

4. The aircraft component of claim 1, wherein said aircraft component has a depth (t) extending from said leading edge (1) to said trailing edge (2) in a direction of said depth axis (8), said first and second ridges (6, 7) having a ridge length (L) in said depth direction, said ridge length (L) being longer than one half of said depth (t).

5. The aircraft component of claim 1, wherein said first and second ridges (6 and 7) taper toward a respective ridge end (6A, 7A) that is spaced from said leading edge (1) in the direction of said depth axis (8), whereby one ridge end (6A) is positioned in a spar area (15) of said aircraft component in said top skin (4) and the other ridge end (7A) is positioned in said bottom skin (5), respectively.

6. The aircraft component of claim 1, comprising a trailing edge area (9) extending along said trailing edge (2) and toward said leading edge, said first ridge (6) having a first ridge portion (6B) in said trailing edge area (9), said second ridge (7) having a second ridge portion (7B) in said trailing edge area (9), said first and second ridge portions (6B, 7B) having a fitting, nesting configuration so that said second ridge portion (7B) fits snugly into said first ridge portion (6B) in said trailing edge area (9) along a width (W).

7. The aircraft component of claim 6, further comprising an interconnection between said first ridge portion (6B) and said second ridge portion (7B) in said trailing edge area (9).

8. The aircraft component of claim 7, wherein said interconnection is a rigid, permanent connection.

9. The aircraft component of claim 8, wherein said rigid, permanent connection is an adhesive bond connection along said width (W).

10. The aircraft component of claim 5, wherein at least one of said ridge ends (6A, 7A) is positioned on a line (L1) extending perpendicularly to said depth axis (8) in said spar area (15).

11. The aircraft component of claim 10, wherein both ridge ends (6A, 7A) are positioned on said line (L1).

12. The aircraft component of claim 1, wherein said first ridge (6) and said second ridge have a cross-section configuration resembling a parabola.

13. The aircraft component of claim 12, wherein said parabola opens downwardly in a wing or elevator component or backwardly in a tail fin component.

14. The aircraft component of claim 12, wherein said first and second ridges have the configuration of a longitudinal portion of an aerodynamically formed cone.

15. The aircraft component of claim 5, wherein said ridge ends (6A, 7A) are formed as pointed tips.

16. The aircraft component of claim 1, comprising a plurality of said at least one first ridge (6) and a corresponding plurality of said at least one second ridge (7) to provide pairs of first and second ridges, wherein a second ridge of a pair is at least partly nested in a first ridge in said pair of ridges, and wherein said pairs of ridges are spaced from each other along said aircraft component at predetermined spacings along said longitudinal axis.

17. The aircraft component of claim 16, wherein said predetermined spacings are equal to one another.

18. The aircraft compound of claim 16, wherein said predetermined spacings are unequal to one another.

19. The aircraft component of claim 16, wherein both first and second ridges forming a pair have cross-sectional configurations which open downwardly or backwardly.

20. The aircraft component of claim 1, wherein each of said first and second ridges has an open end that begins at said trailing edge (2) or is spaced from said trailing edge.

21. The aircraft component of claim 1, wherein said aircraft component is any one component of the following aircraft components: a wing, a wing flap, an aileron, a rudder fin, a rudder tab, and an elevator flap.

22. The aircraft component of claim 1, wherein said first ridge (6) comprises a first ridge portion (6B) in said trailing edge area (9), a first ridge end (6A) opposite said first ridge portion (6B) and a first elongated ridge section (6C, 6D, 6E) between said first ridge end (6A) and said first ridge portion (6B), wherein said second ridge comprises a second ridge portion (7B) in said trailing edge area (9), a second ridge end (7A) opposite said second ridge portion (7B), and a second elongated ridge section (7C, 7D, 7E) between said second ridge end (7A) and said second ridge portion (7B), wherein said first ridge section (6C, 6D, 6E) has a first ridge line (6C), wherein said second ridge section has a second ridge line (6C), and wherein a spacing (VS) between said first and second ridge lines (6C, 7C) increases in a direction toward said first and second ridge ends (6A, 7A).

23. The aircraft component of claim 22, wherein said first ridge portion (6B) and said second ridge portion (7B) are intimately bonded to each other along a width (W) of said trailing edge area (9).

* * * * *

UNITED STATES PATENT AND TRADEMARK OFFICE
CERTIFICATE OF CORRECTION

PATENT NO. : 6,869,050 B1
DATED : March 22, 2005
INVENTOR(S) : Burchard

It is certified that error appears in the above-identified patent and that said Letters Patent is hereby corrected as shown below:

Column 3,
Line 50, after "schematically the", replace "prima ry" by -- primary --;

Column 8,
Line 9, after "aircraft", replace "compound" by -- component --.

Signed and Sealed this

Twelfth Day of July, 2005

JON W. DUDAS
*Director of the United States Patent and Trademark Office*